(12) United States Patent
RafieeArashtnab

(10) Patent No.: US 11,619,212 B2
(45) Date of Patent: Apr. 4, 2023

(54) ELECTRIC CABLE FOR A WIND TURBINE AND WIND TURBINE

(71) Applicant: Siemens Gamesa Renewable Energy A/S, Brande (DK)

(72) Inventor: Mahsa RafieeArashtnab, Brande (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 248 days.

(21) Appl. No.: 16/860,106

(22) Filed: Apr. 28, 2020

(65) Prior Publication Data
US 2020/0355168 A1 Nov. 12, 2020

(30) Foreign Application Priority Data

May 9, 2019 (EP) .................... 19173576

(51) Int. Cl.
| H01B 7/18 | (2006.01) |
| H01B 7/42 | (2006.01) |
| F03D 80/80 | (2016.01) |
| H02G 3/03 | (2006.01) |
| H02K 7/18 | (2006.01) |

(52) U.S. Cl.
CPC ............ F03D 80/85 (2016.05); H01B 7/184 (2013.01); H01B 7/1875 (2013.01); H01B 7/426 (2013.01); H02K 7/1838 (2013.01)

(58) Field of Classification Search
CPC ...... H01B 7/184; H01B 7/426; H01B 7/1875; F03D 80/85; H02K 7/1838
See application file for complete search history.

(56) References Cited

U.S. PATENT DOCUMENTS

| 3,621,108 A * | 11/1971 | Cleaveland | H02G 5/10 |
| | | | 174/15.6 |
| 2013/0214538 A1* | 8/2013 | Himmelmann | F03D 80/85 |
| | | | 290/55 |
| 2018/0038351 A1* | 2/2018 | Jacobsen | H02K 9/04 |
| 2020/0185123 A1* | 6/2020 | Jung | C08K 9/04 |

FOREIGN PATENT DOCUMENTS

| EP | 3279469 A1 | 2/2018 |
| FR | 1151858 A * | 2/1958 |
| FR | 1151858 A | 2/1958 |
| GB | 281535 A | 12/1927 |
| WO | WO 2019011920 A1 | 1/2019 |

OTHER PUBLICATIONS

European Search Report dated Aug. 8, 2019 for Application No. 19173576.0.

* cited by examiner

*Primary Examiner* — Hoa C Nguyen
*Assistant Examiner* — Amol H Patel
(74) *Attorney, Agent, or Firm* — Schmeiser, Olsen & Watts LLP

(57) ABSTRACT

Provided is an electric cable for a wind turbine, wherein the electric cable includes at least one cooling element) to cool the electric cable, wherein the cooling element protrudes from the surface of the electric cable.

8 Claims, 4 Drawing Sheets

ELECTRIC CABLE FOR A WIND TURBINE AND WIND TURBINE

CROSS-REFERENCE TO RELATED APPLICATIONS

This application claims priority to European Application No. 19173576.0, having a filing date of May 9, 2019, the entire contents of which are hereby incorporated by reference.

FIELD OF TECHNOLOGY

The following relates to an electric cable for a wind turbine.

BACKGROUND

Since electric cables of wind turbines typically carry high currents, heat is generated by the wires or conductors of these cables. As a consequence, the cables have to be cooled, e.g. by convection of air passing by the cable, by a draft flow in the tower or the like. Additionally, a tower fan can be provided producing a forced flow of, in particular ambient, air through the tower and cooling the cables. The cooling requirements of the cables become quite challenging in extreme weather conditions, e.g. when the temperature of the ambient air is a relatively high. In particular, when the temperature of the ambient air is around 45° C. or higher, an efficient cooling of the cables cannot be ensured.

SUMMARY

An aspect relates to an enhanced concept for cooling the cables of a wind turbine, in particular to ensure a sufficient cooling also at extreme weather conditions.

To solve this problem, an electric cable for a wind turbine is characterized in that the electric cable comprises at least one cooling element to cool the electric cable, wherein the cooling element protrudes from the surface of the electric cable.

The cooling element acts as a means for transferring heat from the cable to the air in the vicinity of the cable. The cooling element increases the surface area of the cable being in contact with the air which leads to a higher efficiency of the heat transfer from the region of the cable, where the heat is typically produced in, e.g. a conductor or a wire, to the air. In addition, since the cooling element protrudes from the surface of the electric cable, the movement of air passing by the cable is affected by the cooling element, e.g. leading to turbulences or swirls of the air in the vicinity of the cable, which also enhance the heat transfer from the cable to the air.

Both effects, the increase of the surface area of the cable and the creation of turbulences of the air passing by the cable lead to an improved cooling rate or cooling capacity of the cables. In other words, the amount of heat which can be removed from the cable within a certain time span and under certain temperature conditions is increased. As a consequence, a sufficient cooling can be ensured even at weather conditions with high air temperatures. Furthermore, the upper limit of the power production rate of the wind turbine caused by the heat generated by the cables is raised leading to a higher efficiency of the wind turbine.

In a preferred embodiment of the invention, the cooling element is a fin. Fins typically comprise an elongated and plate-like or, in other words, flat structure. Especially if a plurality of fins are provided, the surface of the electric cable interacting with the air passing by the cable can be increased using with less additional material. Thus, a lightweight construction as well as low additional material costs of the cable are possible.

The electric cable can comprise several annular fins as cooling elements, preferably extending at least partially, along the circumference of the electric cable. Geometrically, the annular fins may have the shape of rings, in particular having a rectangular cross section, wherein the conducting element of the cable, in particular a core or a conductor or a wire, extends essentially through the center of the inner opening of the annular fins along a longitudinal axis. The annular fin can also comprise other ring-like geometrical structures with triangular or partially circular or other suitable cross-sections.

The cooling efficiency can be adapted by changing the geometrical properties of the cooling element. Since the hydrodynamic properties of annular, in particular cylindrical, fins are well known, certain values for the geometrical properties, in particular dimension and shape, can be chosen to realize a desired cooling rate of the respective cable.

The distance between two adjacent of the several annular fins can be between 1 mm and 100 mm, in particular between 5 mm and 40 mm. The extension of one single annular fin along the longitudinal cable axis can be between 0.5 mm and 5 mm.

In another embodiment of the invention, the cooling element is a helical, circumferential fin which extends along the periphery of the electric cable. In this embodiment, the cooling element comprises a spiral shape twisted around the longitudinal axis of the electric cable. There can be provided only one fin which extends along the electric cable continuously. Alternatively, several helical fins can be provided, each with a certain length and covering a certain longitudinal section of the electric cable. In this embodiment even two or more parallel helical fins can extend along the periphery of the electric cable, e.g. forming a double or multiple helical structure.

Due to the wound geometrical shape of the helical fin, turbulences or swirls of the air passing by the electric cable are induced even more efficiently and, hence, the cooling rate is improved. The geometrical properties of the helical fin, in particular its dimension and/or shape and/or the gradient of the windings, i.e. the angle between the fin and the longitudinal axis of the electric cable, can be chosen as certain values to realize a desired cooling rate.

In an embodiment of the invention, the at least one cooling element can be part of or can be attached to a metallic sheath of the electric cable. The cooling element is preferably a fin protruding from the anti-corrosion sheath of the electric cable. The electric cable can be multi-layered, i.e. it can be a coaxial cable or the like. In this embodiment, preferably a conductor of the cable is located in the axial centre of the electric cable and covered by a conductor screen. Radially outwards, the conductor screen can be covered by an insulation layer, which might consist of a dielectric material like plastics or the like. Going radially further outwards, an insulation screen is provided which is covered by the metallic sheath. The metallic sheath reduces potential electromagnetic interferences between the cable and other electrical devices located in the vicinity of the cable. The outermost layer of the shielded cable can be an anti-corrosion sheath preventing the cable from humidity, radiation or other unwanted influences from the outside. Since the metallic sheath typically comprises a comparably high thermal conductivity, the cooling efficiency is improved if the cooling element is part of or being in thermal contact with the metallic sheath. The cooling element can be exposed or, at least partially, covered by the anti-corrosion sheath.

The at least one cooling element can consist of metal, in particular copper or aluminium, preferably being covered by the anti-corrosion sheath. Since the cooling efficiency increases with an increasing thermal conductivity of the cooling element, metal is an ideal material for the cooling element. Other suitable materials comprising a sufficient thermal conductivity can be used for the cooling element as well.

Furthermore, embodiments of the present invention relate to a wind turbine comprising at least one electric cable according to embodiments of the invention. All features of the electric cable according to embodiments of the present invention and the respective advantages also apply to the wind turbine according to embodiments of the present invention and vice versa.

The wind turbine typically comprises a tower and a nacelle on top of the tower. The nacelle typically houses a generator which is connected to a hub of the wind turbine via an axle, wherein blades interacting with the wind are attached to the hub. The electric cable can electrically connect components of the wind turbine like the generator, a power transformer or the like with each other or with remote components. The cable can be located within or run through the nacelle and/or the tower and/or other parts of the wind turbine. The cable is often fixed to a wall of the tower of the wind turbine.

The wind turbine preferably comprises at least two openings to enable air to enter and to leave the interior of the wind turbine, in particular the tower. Exemplarily, air filters can be provided on the openings preventing air contaminated by dust or other pollution from entering the wind turbine. Preferably, at least one of the openings is located in a lower part of the wind turbine like on the bottom of the tower, and at least one of the other openings is located on an upper part of the wind turbine, especially on the top of the tower or the roof or canopy of the nacelle. The cooling of the cables can be realized by ambient air entering one of the openings of the wind turbine and leaving the wind turbine through another opening, realising an airflow through the wind turbine cooling the electric cables.

Although the airflow can be driven by the stack or chimney effect, preferably, at least one cooling fan can be provided to create or increase the airflow through the wind turbine. Alternatively, the air cooling the cable can circulate within the tower, wherein this circulation might also be driven by the at least one cooling fan. By adjusting the operation power of the at least one cooling fan, the airflow and, hence, the cooling rate of the electric cable can be changed and adapted to current conditions like the power production rate of the wind turbine or the temperature of the ambient air or the like.

BRIEF DESCRIPTION

Some of the embodiments will be described in detail, with references to the following Figures, wherein like designations denote like members, wherein.

DETAILED DESCRIPTION

Figure 1:
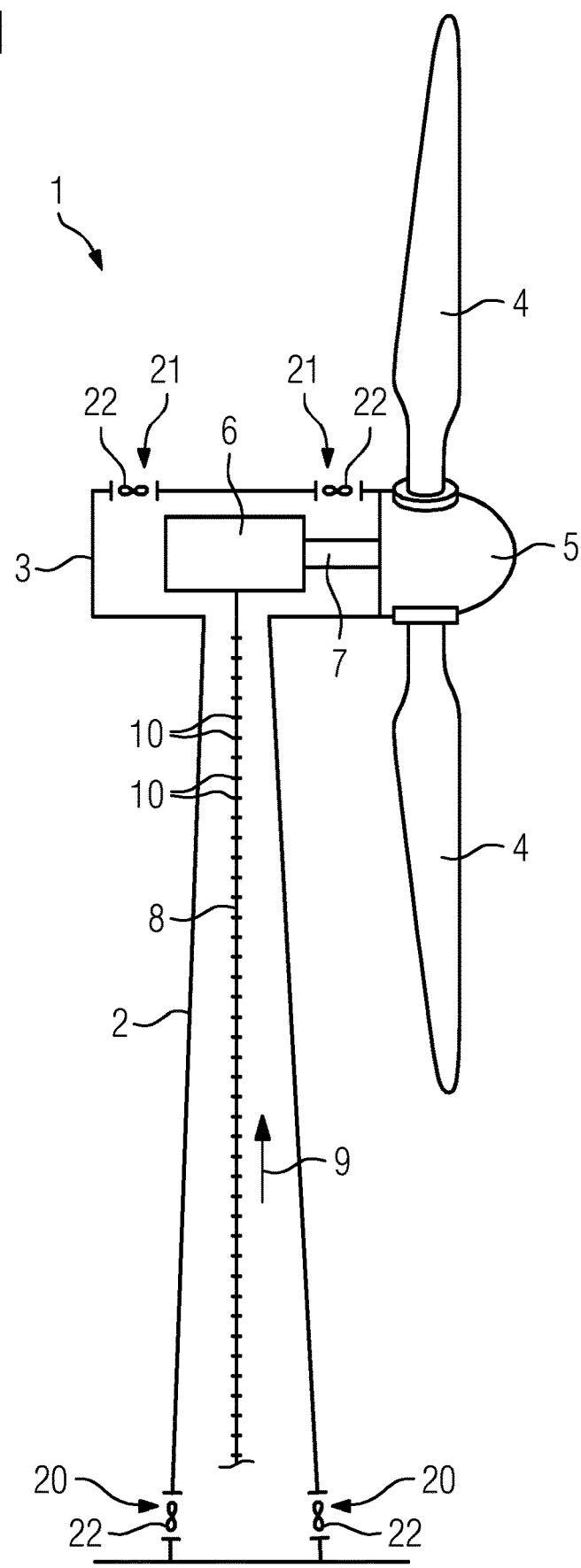
FIG. 1 is a wind turbine according to embodiments of the present invention.

FIG. 1 shows a wind turbine 1 comprising a tower 2 and a nacelle 3, wherein the nacelle 3 is located on the top of the tower 2. The wind turbine 1 further comprises blades 4 which are attached to a hub 5. The hub 5 is connected to a generator 6 located within the nacelle 3 via a shaft 7. The rotation of the hub 5, which is powered by the wind interacting with the blades 4, is transferred to a rotor of the generator 6 to generate electric power.

The wind turbine 1 furthermore comprises an electric cable 8 which electrically connects electrical components of the wind turbine 1. Exemplarily, the electric cable 8 connects the generator 6 of the wind turbine 1 with another component of the wind turbine 1 or a remote component. The electric cable 8 extends from the generator 6 partially through the nacelle 3 downwards into the tower 2, where it is attached to the wall of the tower 2.

In consequence of typically carrying high voltages, the electric cable 8 produces heat and has to be cooled. In many cases, the cooling of the cable 8 is effected by air passing by the cable 8. The respective airflow is indicated in FIG. 1 by an arrow 9 and will be described later in more detail.

To increase the heat transfer from the cable 8 to the air passing by the cable 8, the cable 8 comprises cooling elements 10 which protrude from the surface of the electric cable 8. The cooling elements 10 increase the surface of the cable 8 and thus the contact area between the electric cable 8 and the air leading to an increased overall heat transfer from the electric cable 8 to the air.

In addition, the cooling elements 10 act as obstacles for the air passing by the electric cable 8, causing turbulences of the airflow. These turbulences also increase the velocity of air near the surface of the cable 8, reducing drag and increasing the heat transfer from the electric cable 8 to the air.

Hence, the cooling elements lead to an enhanced achievable cooling rate of the cable 8, such that a sufficient cooling capacity is ensured even at high temperatures. Furthermore, an increase of the power production by the generator 6 is possible, since the resulting increase of heat generated by the cable 8 can be compensated by the increased cooling rate or cooling capacity of the cable 8 due to the cooling elements 10.

Figure 2:
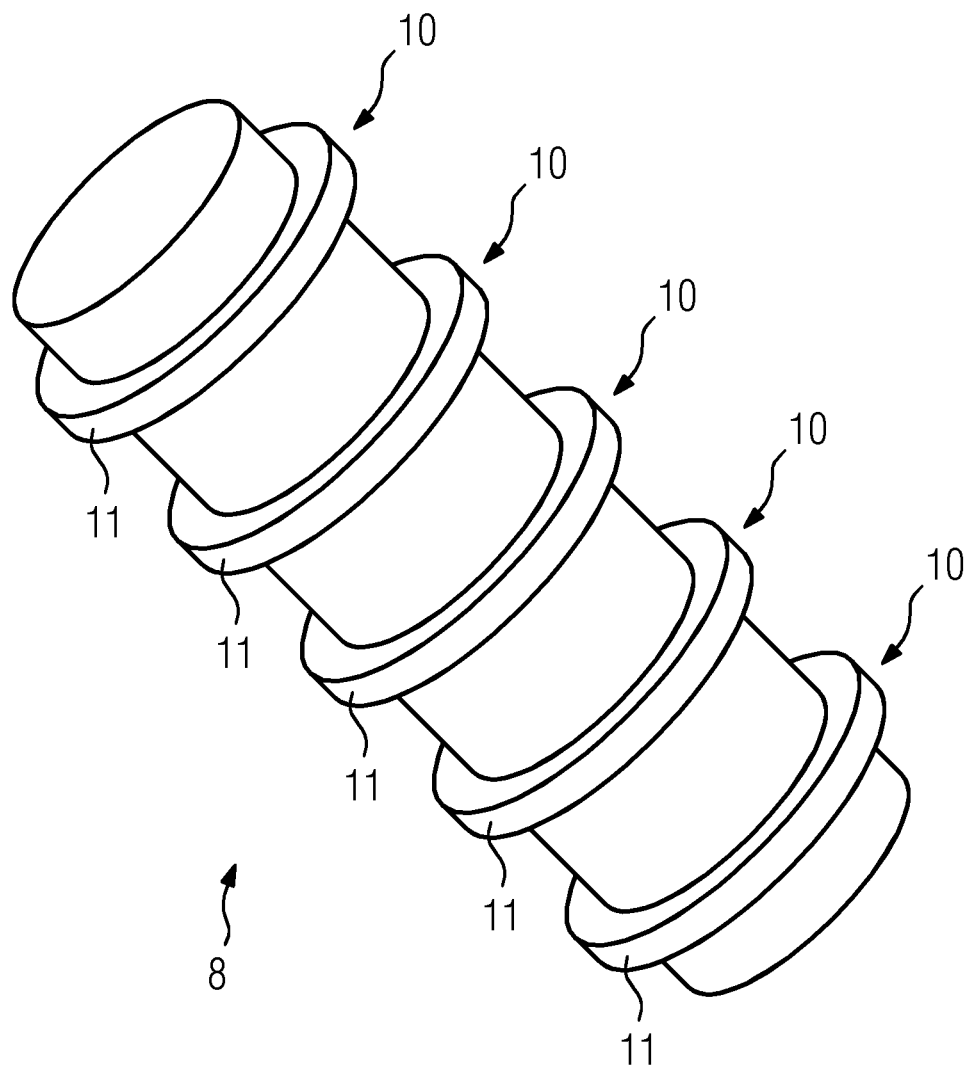
FIG. 2 is a first embodiment of an electric cable.

FIG. 2 shows a detailed view of a first embodiment of the electric cable 8. Here, the cooling elements 10 are annular fins 11 extending along the circumference of the electric cable 8. The cross-sectional shape of each of the annular fins 11 is rectangular, meaning that the geometrical shape of each of the annular fins 11 is a ring or hollow cylinder of low height. Exemplarily, the height of the hollow cylinders forming the annular fins 11 is about 1 mm and the distance between two adjacent annular fins is about 10 mm.

Figure 3:
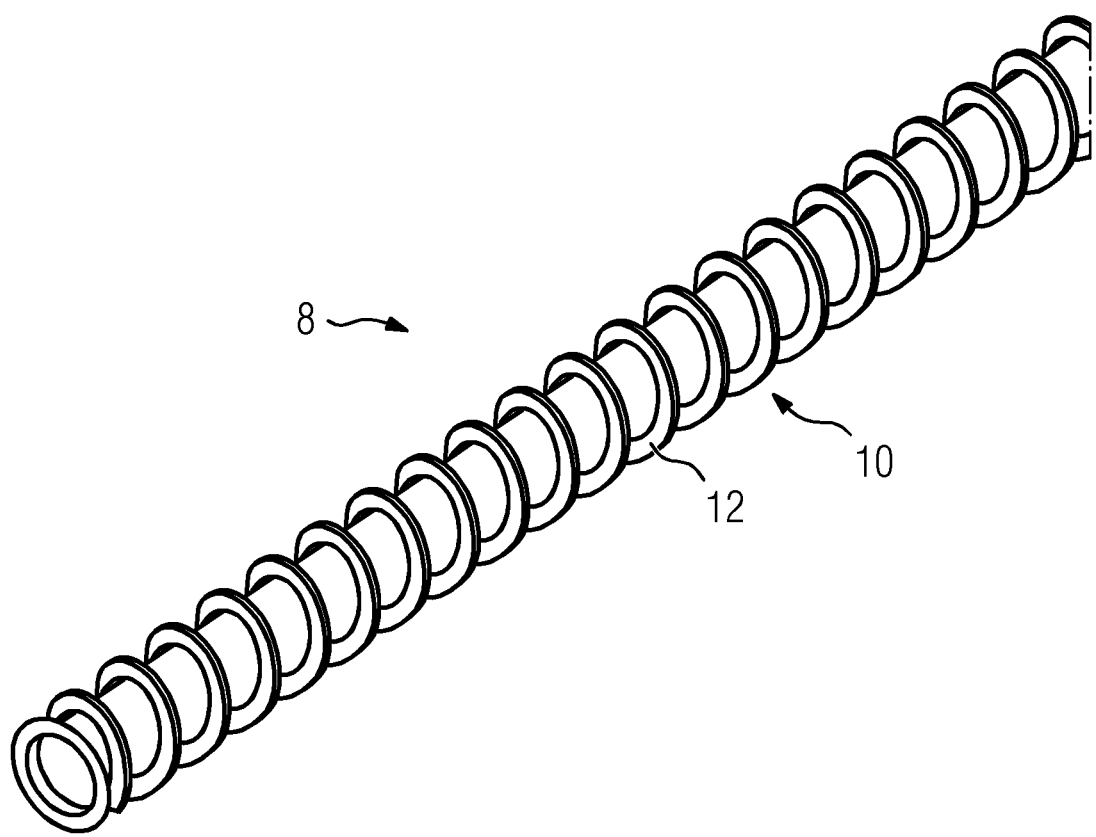
FIG. 3 is a second embodiment of an electric cable.

FIG. 3 shows a second embodiment of the electric cable 8, wherein the cooling element 10 is provided as a helical, circumferential fin 12 along the periphery of the electric cable 8. Exemplarily, the helical, circumferential fin 12 extends along the cable 8 continuously. Alternatively, several separate helical fins 12 can be provided each covering a certain longitudinal section of the electric cable 8. Even two or more parallel helical fins 12 can extend along the periphery of the electric cable 8, e.g. forming a double- or multiple helical structure.

Due to the twisted shape of the helical, circumferential fin 12, the cooling element 10 produces or increases turbulences and swirls of the air passing by the cable 8 which lead to an even higher cooling efficiency. Exemplarily, the gradient of the twisted structure of the helical, circumferential fin 12 is chosen such that at a length of 20 cm of the cable 8, the helical, circumferential fin 12 twists eight times around the cable 8.

Figure 4:
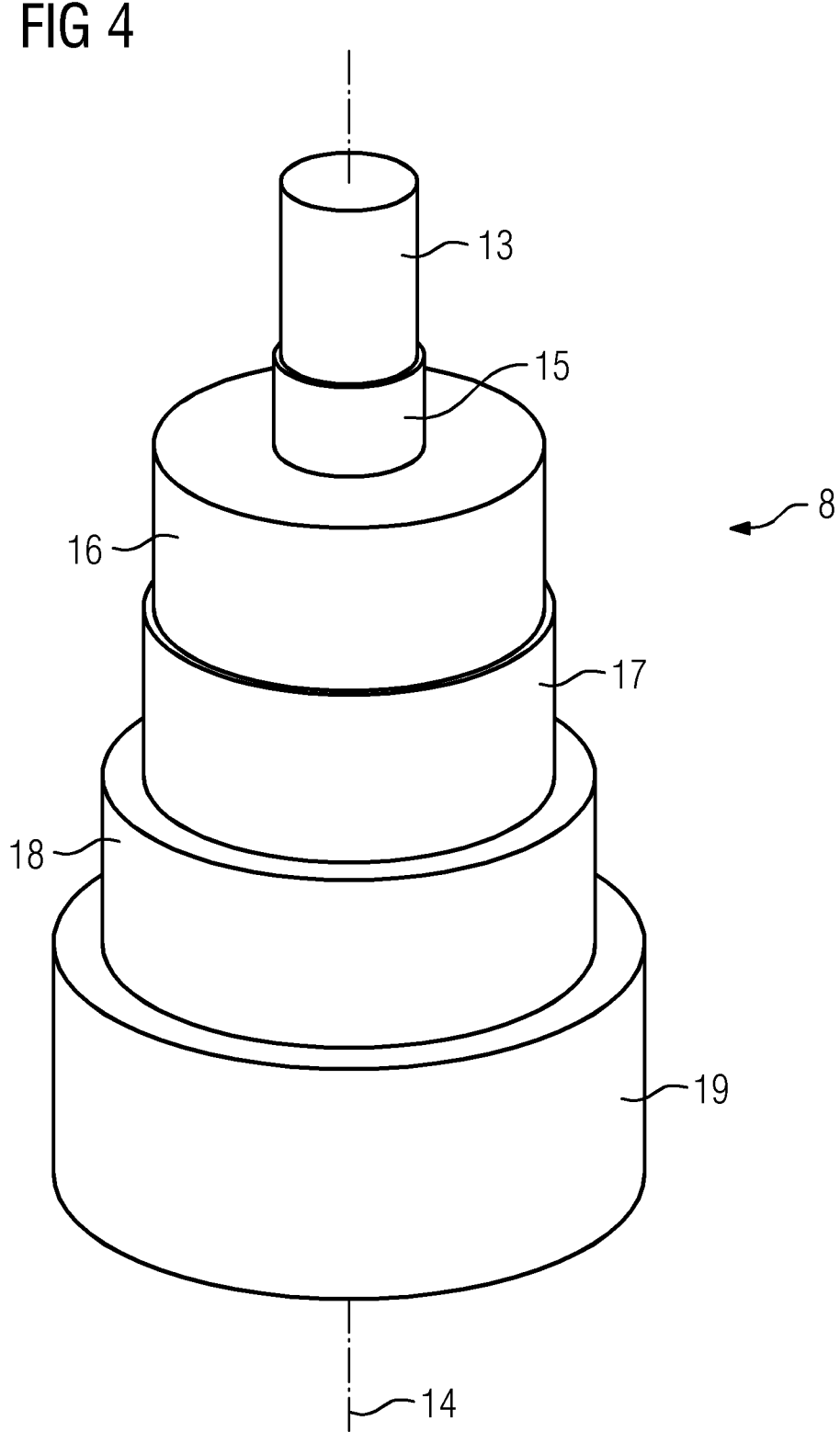
FIG. 4 is a detailed view of the electric cable as shown in FIG. 1 or 2.

FIG. 4 shows exemplary details of the inner structure of the cable 8. For reasons of clarity, the cooling elements 10 are not shown in FIG. 4. The cable 8 comprises a wire or conductor 13 extending along the longitudinal axis 14 of the cable 8. The conductor 13 is enclosed by a conductor screen 15 wherein radially outwards an insulation layer 16, which exemplarily consists of plastics, is provided. The insulation layer 16 is covered by an insulation screen 17. Next, a metallic sheath 18 is provided to shield the conductor 13 from electromagnetic signals from outside or to prevent electromagnetic signals from the conductor 13 to influence other electrical components in the vicinity of the cable 8. To protect the components of the electric cable 8 from humidity or radiation from outside, the metallic sheath 18 is covered by an anti-corrosion sheath 19 which exemplarily consists of plastics.

Although it is not shown in FIG. 4, the cooling elements 10 are part of the metallic sheath 18 of the electric cable 8. Alternatively, the cooling elements 10 can be attached or, in other words, be in thermal contact with the metallic sheath 18.

Although the cooling elements 10 can basically protrude from the anti-corrosion sheath 19, the cooling elements 10 are covered by the anti-corrosion sheath 19. Hence, the anti-corrosion sheath 19 also protects the cooling elements 10 from erosion or corrosion, which would otherwise be caused by humidity of the air passing by the cable 8.

Next, details of the airflow indicated by the arrow 9 in FIG. 1 will be described. Independently from the details of the structure of the cable 8, in particular of the cooling elements 10, the wind turbine 1 comprises two lower openings 20 and two upper openings 21. The lower openings 20 are located on the bottom of the tower 2 and the upper openings 21 are located on top of a roof or a canopy of the nacelle 3. Due to the chimney effect, the openings 20, 21 lead to the airflow as indicated by the arrow 9. However, to provide a stronger and controllable airflow, a fan 22 is provided together with an air filter (not shown) at each of the openings 20, 21. Turning the fans 22 on leads to a stronger airflow and thus to an enhanced cooling efficiency.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
a tower;
a nacelle located on a top of the tower, the nacelle including at least one opening on a top of the nacelle;
at least one electric cable disposed within the tower, the at least one electric cable comprising at least one cooling element to cool the electric cable, wherein the at least one cooling element protrudes from a surface of the electric cable; and
at least one cooling fan provided at the at least one opening on the top of the nacelle;
wherein:
the at least one cooling fan is configured to drive a circulation of air within the wind turbine to cool the at least one electric cable; or
the at least one cooling fan is configured to increase an airflow through the tower, wherein at least two openings enable air to enter and to leave an interior of the wind turbine tower, thereby cooling the at least one electric cable.

2. The wind turbine according to claim 1, wherein the at least one cooling element is a fin.

3. The wind turbine according to claim 2, further comprising several annular fins as cooling elements, extending, at least partially, along a circumference of the electric cable.

4. The wind turbine according to claim 3, wherein a distance between two adjacent of the several annular fins is between 1 mm and 100 mm.

5. The wind turbine according to claim 1, wherein the at least one cooling element is a helical, circumferential fin which extends along a periphery of the electric cable.

6. The wind turbine according to claim 1, wherein the at least one cooling element is part of or attached to a metallic sheath of the electric cable.

7. The wind turbine according to claim 6, wherein the metallic sheath is covered by an anti-corrosion sheath forming the surface of the electric cable.

8. The wind turbine according to claim 1, wherein the at least one cooling element consists of metal.

\* \* \* \* \*